US008960399B2

(12) United States Patent
Langenkaemper et al.

(10) Patent No.: US 8,960,399 B2
(45) Date of Patent: Feb. 24, 2015

(54) MULTIDISK SHIFTING ELEMENT

(71) Applicant: ZF Friedrichshafen AG, Friedrichshafen (DE)

(72) Inventors: Derk Langenkaemper, Lindau (DE); Harald Mueller, Meckenbeuren (DE); Anton Fritzer, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 130 days.

(21) Appl. No.: 13/748,710

(22) Filed: Jan. 24, 2013

(65) Prior Publication Data
US 2013/0213758 A1 Aug. 22, 2013

(30) Foreign Application Priority Data

Feb. 17, 2012 (DE) .......................... 10 2012 202 470

(51) Int. Cl.
*F16D 13/64* (2006.01)
*F16D 13/69* (2006.01)

(52) U.S. Cl.
CPC ............... *F16D 13/64* (2013.01); *F16D 13/69* (2013.01)
USPC ................................... 192/70.28; 192/107 C

(58) Field of Classification Search
None
See application file for complete search history.

(56) References Cited

U.S. PATENT DOCUMENTS

| 1,340,885 | A | | 5/1920 | Fuller | |
| 2,927,673 | A | | 3/1960 | Sand | |
| 2,968,381 | A | * | 1/1961 | Vosler | 192/107 R |
| 3,016,119 | A | * | 1/1962 | Rosenberger et al. | 192/70.14 |
| 3,063,530 | A | | 11/1962 | Rosenberger et al. | |
| 6,644,453 | B2 | | 11/2003 | Kremer | |
| 7,806,245 | B2 | | 10/2010 | Oh | |
| 8,286,773 | B2 | * | 10/2012 | Nakamura et al. | 192/70.14 |
| 2011/0147158 | A1 | | 6/2011 | Schaefer et al. | |

FOREIGN PATENT DOCUMENTS

| CH | 342427 | 12/1959 |
| DE | 1 089 594 | 9/1960 |
| DE | 10 2008 063 662 A1 | 2/2010 |
| EP | 1 128 081 A2 | 8/2001 |
| JP | 11-230197 A | 8/1999 |

OTHER PUBLICATIONS

German Office Action Corresponding to DE 10 2012 202 470.0.

* cited by examiner

*Primary Examiner* — Rodney H Bonck
(74) *Attorney, Agent, or Firm* — Davis & Bujold, PLLC; Michael J. Bujold

(57) ABSTRACT

A multi-disk shifting element of a motor vehicle transmission, which includes a plurality of outer disks (2) and a plurality of lining disks (1) which, when viewed axially, are arranged in alternation one after another. The outer disks include a number of flat outer disks (AL1) and a number of corrugated outer disks (AL2, AL3).

6 Claims, 4 Drawing Sheets

MULTIDISK SHIFTING ELEMENT

This application claims priority from German patent application serial no. 10 2012 202 470.0 filed Feb. 17, 2012.

FIELD OF THE INVENTION

The present invention relates to a multi-disk shifting element of a motor vehicle transmission.

BACKGROUND OF THE INVENTION

In multi-disk shifting elements wobbling of the disks is a well known problem, which is exacerbated at large speed differences between the outer and the lining disks in the open condition of the shifting element, such that with shifting elements of large diameter with high circumferential speeds, the outer disks in particular tend to wobble. This involves nutation and precession movements of individual disks, which with increasing speed lead to periodic, axial oscillations of the disk packet as a whole. Disadvantageously, disk wobble leads to high drag torques and results in a temperature increase. With quantitatively small idling torques disk wobble can also result in very large torque losses since some disks, due to their wobbling motion, produce greater friction against the surrounding medium and/or against adjacent disks; furthermore, disk wobble can lead to damage or even destruction of the multi-disk shifting element.

Moreover, sticking of the lining disks to the outer disks of the shifting element in the open condition can also result in higher drag torques and temperature elevation.

To prevent disk wobble and sticking of the lining disks to the outer disks, it is known from the prior art to make the outer disks with corrugations. The corrugations damp or prevent disk wobble; furthermore, the corrugations separate disks that tend to stick to one another.

For example, from U.S. Pat. No. 7,806,245 B2 a clutch system is known, which comprises a rotation axis rotated by a torque, at least one pressure plate arranged in an outer area of the rotation axis and which can move along an axial direction of the rotation axis, at least one disk arranged in alternation with the pressure plate and which can move along an axial direction of the rotation axis, and a piston which applies a force on the disk in the axial direction of the rotation axis, so that a frictional force is produced between the pressure plate and the disk. In this case each disk has at least one bend or corrugation along its radial direction; another multi-disk clutch with disks having corrugations in the same direction as one another is described in U.S. Pat. No. 2,927,673 A.

Furthermore, U.S. Pat. No. 1,340,885 A describes a multi-disk clutch with disks corrugated in the same direction and disks corrugated in opposite directions.

Corrugations of the outer disks can be regarded as a geometrical defect which, in combination with the rotating lining disks, leads to oscillations of the system which, by virtue of the corresponding torque transfer via the drive-train, are perceptible during shifting processes. A design of a multi-disk shifting element with disks having oppositely directed corrugations reduces the oscillations during shifting processes but increases the elasticity of the disk packet as a whole, which disadvantageously leads to problems in the control of the shifting processes that make themselves noticeable in the form of perceptible torque impulses.

SUMMARY OF THE INVENTION

The purpose of the present invention is to provide a multi-disk shifting element of a motor vehicle transmission, with which disk wobble and sticking of the lining disks to the outer disks are prevented and in which oscillations are excited as little as possible and the elasticity of the disk packet as a whole is low.

Accordingly a multi-disk shifting element of a motor vehicle transmission is proposed, which comprises a plurality of outer disks and a plurality of lining disks which, as viewed axially, are arranged in alternation, wherein the outer disks include a number of flat outer disks and a number of corrugated outer disks.

The corrugated outer disks can be arranged with their corrugations in the same direction, or can include outer disks with their corrugations arranged in the opposite direction to the other corrugated outer disks, and in the latter case the corrugated outer disks, as viewed axially, can be arranged in respective pairs with oppositely directed corrugations.

According to the invention, the flat and the corrugated outer disks can be arranged in any order, so that any combinations are possible. Preferably, in the disk packet of the multi-disk shifting element the outer disks are stacked in such manner that parts of the disk packet which stick to one another when the shifting element is opened are reliably separated and disk wobble is to a large extent damped.

By virtue of the differently designed outer disks of the disk packet, critical areas can be selectively optimized in relation to disk wobble and/or sticking of the lining disks to the outer disks.

In the case of areas of the disk packet that are not critical from the standpoint of disk wobble and/or sticking of the lining disks to the outer disks, it is preferable to use flat outer disks so that the elasticity of the disk packet can be reduced selectively.

BRIEF DESCRIPTION OF THE DRAWINGS

Below, examples of the invention are explained in more detail with reference to the attached figures, which show.

DETAILED DESCRIPTION OF THE PREFERRED EMBODIMENTS

Multi-disk shifting elements are very well known to those with knowledge of the field, so in the figure descriptions that follow only the components relevant to the invention are represented and explained.

Figure 1A:
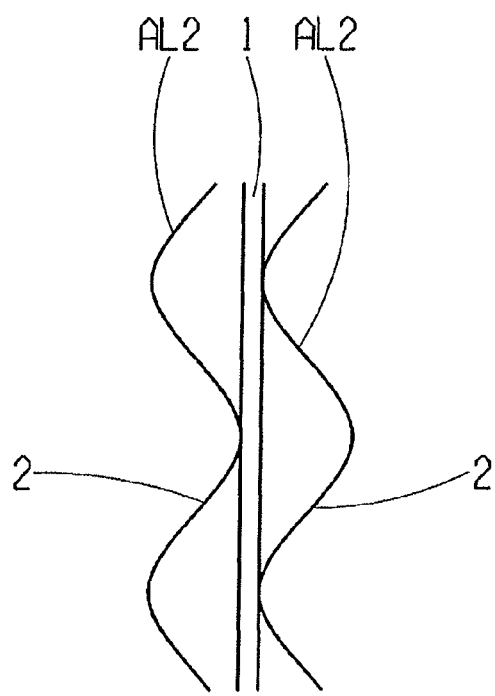
FIGS. 1A and 1: Are schematic representations of the differing corrugation modes of outer disks, showing the arrangement of outer disks with their corrugations in the same direction and in opposite directions, respectively.
Figure 1:
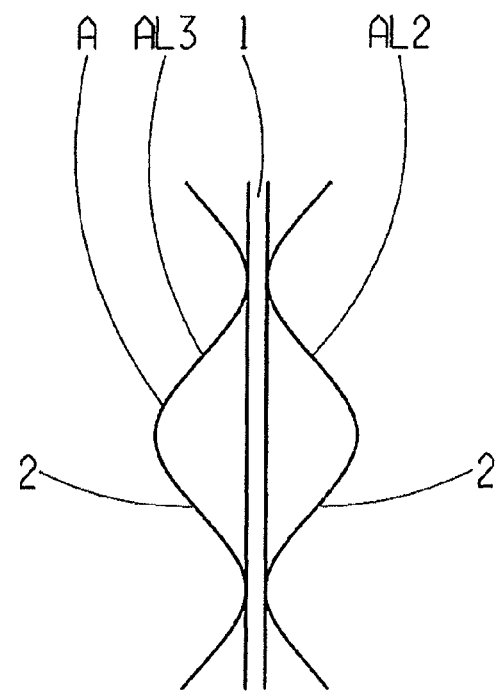

FIG. 1A shows an arrangement of two outer disks 2 and a lining disk 1, in which the two outer disks 2 are made and arranged as disks of type AL2, namely with their corrugations in the same direction. In FIG. 1 the disks 2 are made and arranged as disks of types AL2 and AL3 with their corrugations in opposite directions.

Figure 2:
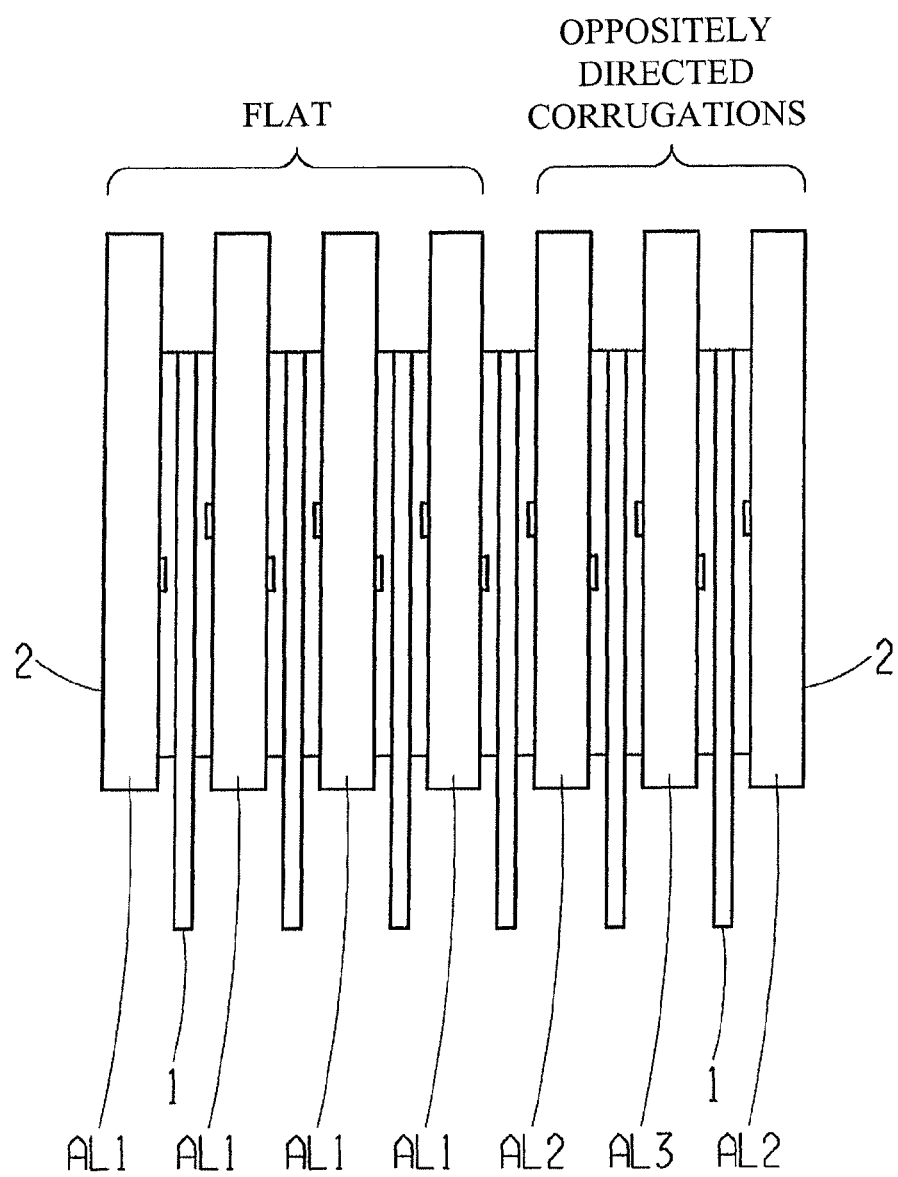
FIG. 2: A schematic representation of a first embodiment of a multi-disk shifting element according to the invention.

According to the invention, and referring to FIG. 2, a multi-disk shifting element according to the invention comprises a plurality of outer disks 2 and a plurality of lining disks 1, the outer disks 2 including a number of flat and a number of corrugated outer disks. In FIG. 2 the flat outer disks 2 are indexed AL1, whereas the outer disks 2 indexed AL2, AL3 correspond to disks of the types AL2 or AL3 as shown in FIG. 1.

In the example shown in FIG. 2 the outer disks 2 are stacked in such manner that, as viewed axially, following four flat outer disks AL1 and outer disk of type AL2, an outer disk of type AL3 and another outer disk of type AL2 are arranged so that the corrugated outer disks 2 are in each case arranged in pairs with oppositely directed corrugations.

Figure 3:
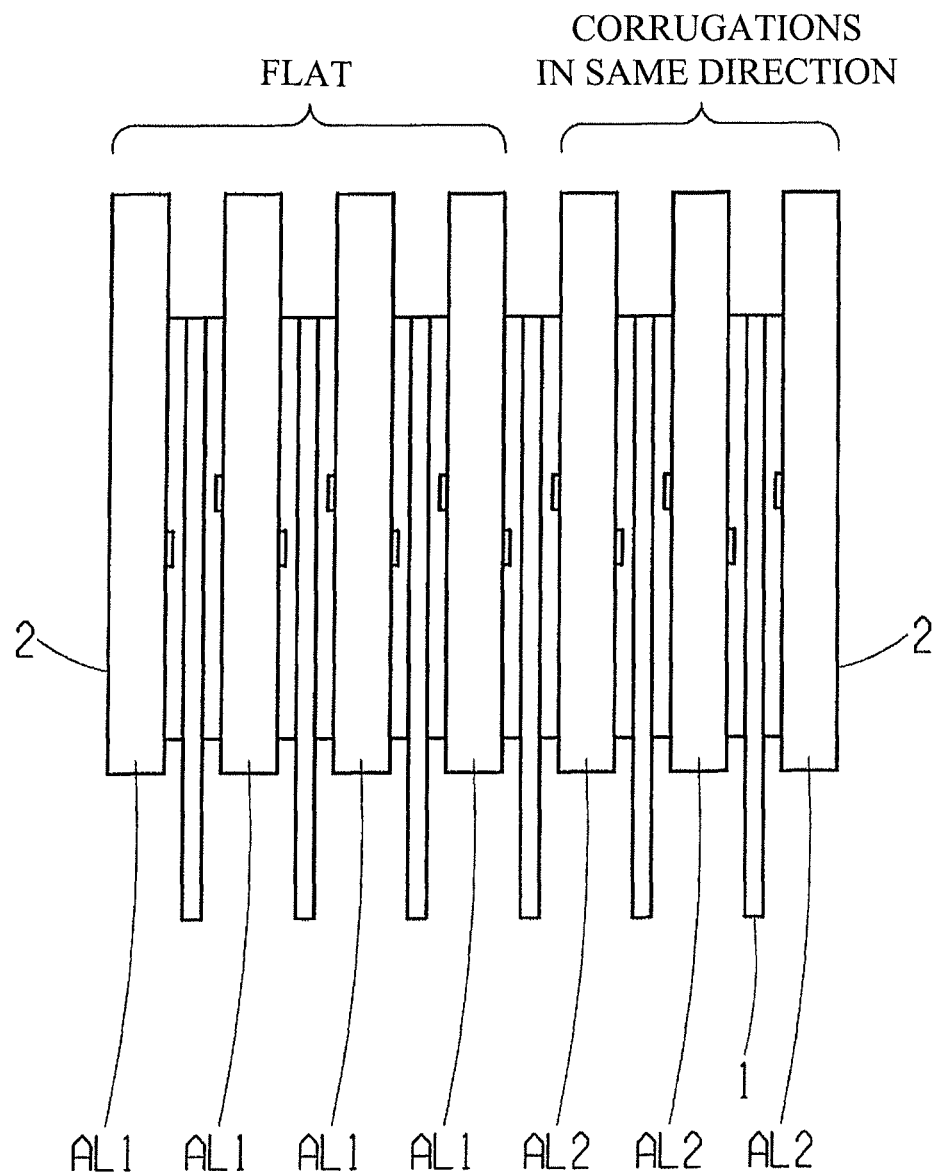
FIG. 3: A schematic representation of a second embodiment of a multi-disk shifting element according to the invention.

Referring now to FIG. 3, a multi-disk shifting element can comprise a plurality of outer disks 2 and a plurality of lining disks 1, the outer disks 2 including a number of flat outer disks AL1 and a number of disks AL2 with their corrugations arranged in the same direction.

In the example shown in FIG. 3, as viewed axially, following four flat outer disks AL1 three outer disks AL2 corrugated in the same direction are provided, i.e. as viewed axially the outer disks 2 are arranged in the sequence: flat outer disks AL1-corrugated outer disks AL2.

By virtue of this design the elasticity of the disk packet is selectively reduced, so that in an area of the disk packet which is critical in relation to disk wobble and/or sticking of the lining disks to the outer disks, the corrugated outer disks AL2 are used.

Figure 4:
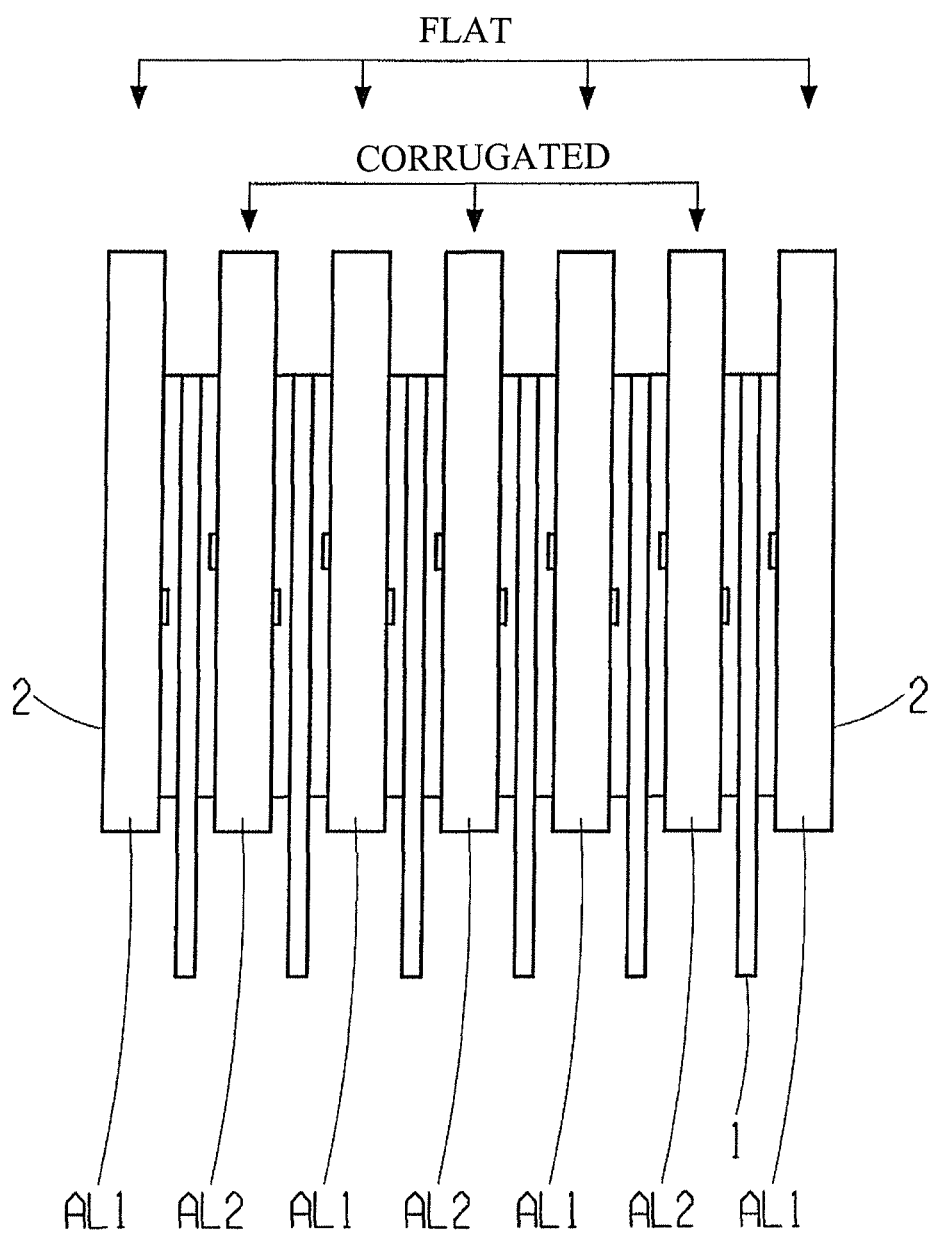
FIG. 4: A schematic representation of another embodiment of a multi-disk shifting element according to the invention.

The object of FIG. 4 is an embodiment in which, as viewed axially, the flat outer disks AL1 and the outer disks AL2 corrugated in the same direction are arranged in alternation one after another.

INDEXES

1 Lining disk
2 Outer disk
AL1 Flat outer disk
AL2 Corrugated outer disk
AL3 Corrugated outer disk

The invention claimed is:

1. A multi-disk shifting element of a motor vehicle transmission, the multi-disk shifting element comprising a plurality of outer disks (2) and a plurality of lining disks (1), the outer disks and the lining disks are alternately arranged along an axis, the outer disks (2) comprise a plurality of flat outer disks (AL1) and a plurality of corrugated outer disks (AL2), the plurality of corrugated outer disks have corrugations, and the plurality of corrugated outer disks are arranged with respect to each other such that the corrugations thereof are aligned in a common direction, and the flat outer disks (AL1) and the corrugated outer disks (AL2) are alternately arranged along the axis, in series, and between one flat outer disk (AL1) and one corrugated outer disk (AL2) adjacent thereto, exactly one lining disk (1) is arranged.

2. The multi-disk shifting element according to claim 1, wherein a first flat outer disk is arranged at one axial end of the multi-disk shifting element and a second flat outer disk is arranged at an opposite axial end of the multi-disk shifting element, and the plurality of flat outer disks are axially located between the first and the second flat outer disk.

3. A multi-disk shifting element of a motor vehicle transmission, the multi-disk shifting element comprising a plurality of outer disks (2) and a plurality of lining disks (1), the outer disks and the lining disks are alternately arranged along an axis, the outer disks (2) comprise a plurality of flat outer disks (AL1) and a plurality of corrugated outer disks (AL2), the plurality of corrugated outer disks have corrugations, and the plurality of corrugated outer disks are arranged with respect to each other such that the corrugations thereof are aligned in a common direction, and the flat outer disks (AL1) and the corrugated outer disks (AL2) are arranged along the axis such that between two adjacent flat outer disks (AL1) in each case only one lining disk (1) is arranged, and between two adjacent corrugated outer disks (AL2) in each case only one lining disk (1) is arranged.

4. The multi-disk shifting element according to claim 3, wherein the plurality of flat outer disks are arranged on one axial side of the multi-disk shifting element with respect to the plurality of corrugated outer disks and the plurality of corrugated outer disks are arranged on an opposite axial side of the multi-disk shifting element with respect to the plurality of flat outer disks.

5. A multi-disk shifting element of a motor vehicle transmission, the multi-disk shifting element comprising a plurality of outer disks (2) and a plurality of lining disks (1), the outer disks and the lining disks are alternately arranged along an axis, the outer disks (2) comprise a plurality of flat outer disks (AL1) and a plurality of corrugated outer disks (AL2, AL3), the corrugated outer disks comprise corrugated outer disks (AL3) having corrugations that are arranged in a direction opposite to a direction of corrugations of other corrugated outer disks (AL2), and when viewed along the axis, each corrugated outer disk (AL2, AL3) is respectively arranged with the corrugations thereof being oppositely directed to a next corrugated outer disk, and the flat outer disks (AL1) and the corrugated outer disks (AL2, AL3) are alternately arranged along the axis one behind the other, such that between a flat outer disk (AL1) and a corrugated outer disk (AL2, AL3) adjacent thereto, only one lining disk (1) is arranged.

6. A multi-disk shifting element of a motor vehicle transmission, the multi-disk shifting element comprising a plurality of outer disks (2) and a plurality of lining disks (1), the outer disks and the lining disks are alternately arranged along an axis, the outer disks (2) comprise a plurality of flat outer disks (AL1) and a plurality of corrugated outer disks (AL2, AL3), the corrugated outer disks comprise corrugated outer disks (AL3) having corrugations that are arranged in a direction opposite to a direction of corrugations of other corrugated outer disks (AL2), and when viewed along the axis, the corrugated outer disks (AL2, AL3) are respectively arranged in pairs with the corrugations thereof being oppositely directed, and the corrugated outer disks (AL2, AL3) are arranged, when viewed along the axis, beside the flat outer disks (AL1), such that between two adjacent flat outer disks (AL1) is arranged in each case one lining disk (1), and between two adjacent corrugated outer disks (AL2, AL3) is arranged each in each case exactly one lining disk (1), and the plurality of flat outer disks are arranged on one axial side of the multi-disk shifting element with respect to the plurality of corrugated outer disks and the plurality of corrugated outer disks are arranged on an opposite axial side of the multi-disk shifting element with respect to the plurality of flat outer disks.

* * * * *